US012561435B2

(12) United States Patent
Palatnik de Sousa et al.

(10) Patent No.: US 12,561,435 B2
(45) Date of Patent: Feb. 24, 2026

(54) AUDITING CLASSIFIER MODELS WITH ADVERSARIALLY ROBUST XAI COMMITTEES

(71) Applicant: Dell Products L.P., Round Rock, TX (US)

(72) Inventors: Iam Palatnik de Sousa, Rio de Janeiro (BR); Adriana Bechara Prado, Niterói (BR)

(73) Assignee: Dell Products L.P., Round Rock, TX (US)

(*) Notice: Subject to any disclaimer, the term of this patent is extended or adjusted under 35 U.S.C. 154(b) by 283 days.

(21) Appl. No.: 18/067,140

(22) Filed: Dec. 16, 2022

(65) Prior Publication Data
US 2024/0202335 A1      Jun. 20, 2024

(51) Int. Cl.
*G06F 21/56*          (2013.01)
*G06N 5/045*          (2023.01)

(52) U.S. Cl.
CPC ........... *G06F 21/566* (2013.01); *G06N 5/045* (2013.01); *G06F 2221/033* (2013.01)

(58) Field of Classification Search
CPC ........ G06N 5/045; G06N 20/00; G06N 3/094; G06F 21/566; G06F 2221/033
See application file for complete search history.

(56) References Cited

U.S. PATENT DOCUMENTS

| | | | | |
|---|---|---|---|---|
| 5,222,197 A * | 6/1993 | Teng | ......................... | G06N 5/04 |
| | | | | 706/46 |
| 7,362,711 B2 * | 4/2008 | Golle | .................. | H04L 63/0492 |
| | | | | 370/252 |
| 2021/0256125 A1 * | 8/2021 | Miller | .................... | G06F 21/577 |
| 2021/0350211 A1 * | 11/2021 | Dalli | ...................... | G06N 3/082 |
| 2021/0350275 A1 * | 11/2021 | Venkateswaran | ....... | G06F 40/30 |
| 2022/0012591 A1 * | 1/2022 | Dalli | ...................... | G06N 3/082 |
| 2023/0386177 A1 * | 11/2023 | Hirai | ..................... | G06T 7/0012 |
| 2024/0013525 A1 * | 1/2024 | Lim | ..................... | G06F 18/214 |
| 2024/0037427 A1 * | 2/2024 | Sharpe | .................. | G06N 5/045 |
| 2024/0386300 A1 * | 11/2024 | Vuppala | ................. | G06N 5/022 |

FOREIGN PATENT DOCUMENTS

WO      WO-2023072702 A1 *   5/2023   ............. G06N 5/045

OTHER PUBLICATIONS

Zhang, X., Wang, N., Shen, H., Ji, S., Luo, X., & Wang, T. (2020). Interpretable deep learning under fire. In 29th {USENIX} security symposium ({USENIX} security 20). (Year: 2020).*

(Continued)

*Primary Examiner* — Catherine Thiaw
*Assistant Examiner* — Amir Mahdi Hajiabbasi
(74) *Attorney, Agent, or Firm* — Workman Nydegger

(57) ABSTRACT

A method includes assembling an explainable artificial intelligence committee comprising two or more explainable artificial intelligence techniques, performing the explainable artificial intelligence techniques on results generated by a machine learning model, as a result of the performing, obtaining respective explanations, generated by each of the explainable artificial intelligence techniques, for the results generated by the machine learning model, and determining that one of the explanations was compromised by an attacker.

18 Claims, 4 Drawing Sheets

(56)                    References Cited

OTHER PUBLICATIONS

Heo, J., Joo, S., & Moon, T. (2019). Fooling neural network interpretations via adversarial model manipulation. Advances in neural information processing systems, 32. (Year: 2019).*

Rieger, L., & Hansen, L. K. (2020). A simple defense against adversarial attacks on heatmap explanations. arXiv preprint arXiv:2007. 06381. (Year: 2020).*

Jyoti, Amlan, et al. "On the robustness of explanations of deep neural network models: A survey." arXiv preprint arXiv:2211.04780 (2022). (Year: 2022).*

Kuppa, Aditya, and Nhien-An Le-Khac. "Black box attacks on explainable artificial intelligence (XAI) methods in cyber security." 2020 International Joint Conference on neural networks (IJCNN). IEEE, 2020. (Year: 2020).*

Pandya, Mayur Anand, P. C. Siddalingaswamy, and Sanjay Singh. "Explainability of image classifiers for targeted adversarial attack." 2022 IEEE 19th India Council International Conference (INDICON). IEEE, 2022. (Year: 2022).*

Li, Changjiang, et al. "DeT: Defending against adversarial examples via decreasing transferability." International Symposium on Cyberspace Safety and Security. Cham: Springer International Publishing, 2019. (Year: 2019).*

Dombrowski, Ann-Kathrin, Maximillian Alber, Christopher Anders, Marcel Ackermann, Klaus-Robert Müller, and Pan Kessel. "Explanations can be manipulated and geometry is to blame." Advances in Neural Information Processing Systems 32 (2019).

Slack, Dylan, Sophie Hilgard, Emily Jia, Sameer Singh, and Himabindu Lakkaraju. "Fooling lime and shap: Adversarial attacks on post hoc explanation methods." In Proceedings of the AAAI/ACM Conference on AI, Ethics, and Society, pp. 180-186. 2020.

Ghorbani, Amirata, Abubakar Abid, and James Zou. "Interpretation of neural networks is fragile." In Proceedings of the AAAI conference on artificial intelligence, vol. 33, No. 01, pp. 3681-3688. 2019.

* cited by examiner

500

ACCESS ANY
AVAILABLE
ADVERSARY INFO — 502

ASSEMBLE
XAI
COMMITTEE — 504

PERFORM XAI
AUDIT ON MODEL — 506

COMPARE RESULTS
OBTAINED BY
XAI COMMITTEE
MEMBERS — 508

IGNORE
COMPROMISED
RESULTS — 510

OUTPUT
EXPLANATION — 512

CORRECT
ANY BIAS — 514

AUDITING CLASSIFIER MODELS WITH ADVERSARIALLY ROBUST XAI COMMITTEES

FIELD OF THE INVENTION

Embodiments of the present invention generally relate to machine learning. More particularly, at least some embodiments of the invention relate to systems, hardware, software, computer-readable media, and methods, for defending against attacks on explainable artificial intelligence methods.

BACKGROUND

Although Machine Learning (ML) has become more pervasive in recent years, much work remains to be done to audit reliability and fairness in the results generated by ML models, particularly when such models are used to make decisions that may greatly affect the lives of people. To this end, explainable artificial intelligence (XAI) techniques have been developed with a view toward uncovering any biases that may be present in the operation of, and results produced by, an AI model.

However, such XAI techniques are not without their limitations and vulnerabilities. As an example, researchers have already demonstrated how fragile such techniques are in, for example, adversarial settings, where explanations can be intentionally controlled and manipulated, thus hiding potential biases in the ML model in question. Indeed, some recent works have demonstrated that biased classifiers can easily be manipulated into generating innocuous explanations in the eyes of the decision-makers.

The lack of specific defenses against interpretation-based attacks creates scenarios where unfair and biased models can reach production and deployment stage, which can potentially cause significant damage to users and to the companies using such biased models. The models may have been initially biased unintentionally during training, or intentionally constructed from the ground up to be biased. In any case however, the biases in a model can, through the use of XAI attacks, be hidden or disguised so that it appears the model is unbiased. Such attacks may undermine confidence in the XAI processes and its outputs.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figures 1, 2:
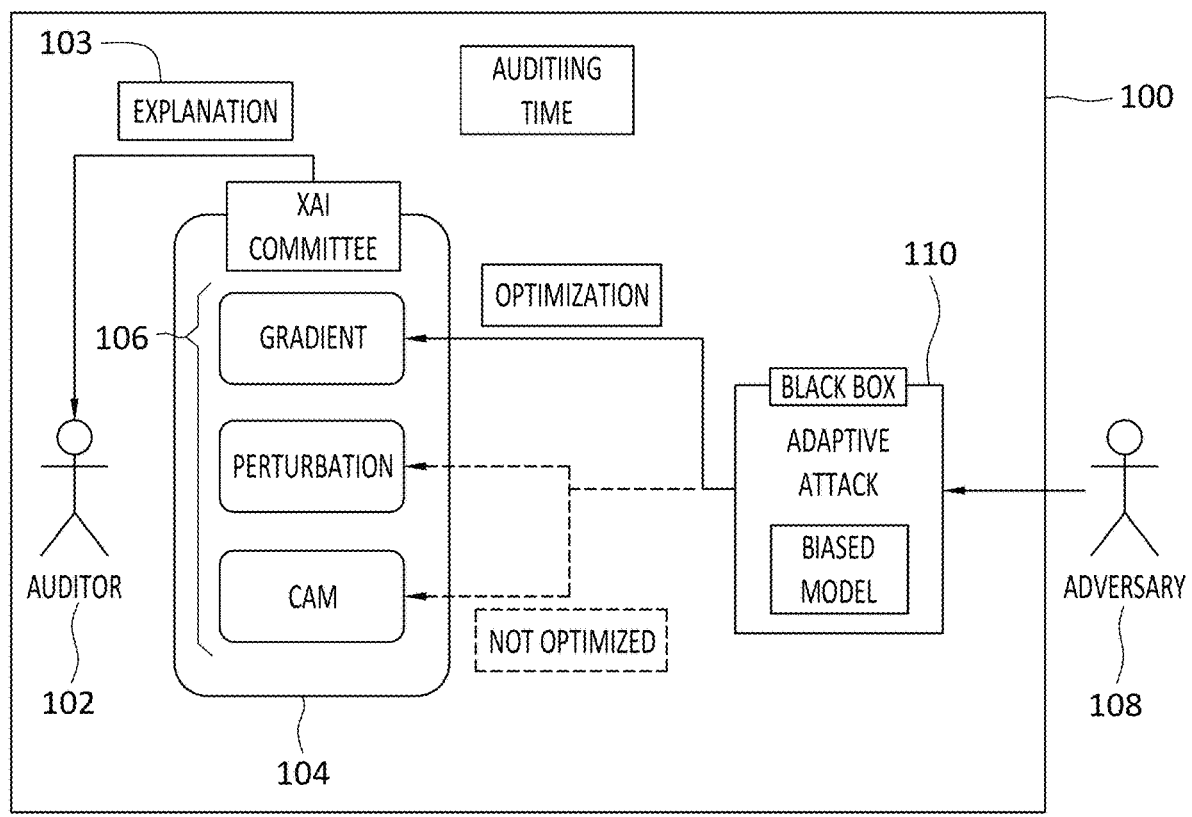
FIG. 1 discloses how an XAI committee counteracts an adversarial attack, in an example embodiment.
FIG. 2 discloses Vanilla Gradients (VG) heatmaps for an original (dog) image, a target (cat) image, and an adversarial optimized image.

Embodiments of the present invention generally relate to machine learning. More particularly, at least some embodiments of the invention relate to systems, hardware, software, computer-readable media, and methods, for defending against attacks on explainable artificial intelligence methods.

In general, an example embodiment of the invention reflects the notion that attacks to one type of XAI method are not necessarily effective against other types of XAI methods. The attacks might also fail if the adversary does not have full knowledge of certain parameters of the XAI algorithm. Thus, an embodiment of the invention may operate to defend a given ML model and XAI auditing system from adversarial attacks. Particularly, an embodiment may comprise a method to audit ML models through the use of not just one, but rather a committee of different XAI techniques. This approach may be more robust than an approach which employs only a single XAI method, or employs only XAI methods of one particular kind, in detecting and revealing adversarial tampering within explanations generated for an ML model. That is, while an XAI attack may succeed against one particular XAI technique, it is unlikely to succeed against all of the XAI techniques in a group, or committee, that comprises different XAI techniques, since at least one of the techniques in the group may not be affected by the attack and so may reveal that an attack has taken place.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, an embodiment may operate to identify, and thwart, an XAI attack, even if the XAI attack is effective when targeted to a particular XAI technique. As another example, an embodiment may be effective in identifying, and thwarting, multiple different types of XAI attacks.

Various other advantages of some example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Explainable Artificial Intelligence

Explainable artificial intelligence (XAI) includes a set of processes and methods that allow users to understand and trust the results of AI/ML models. Explainable AI may be used to evaluate a given model, its expected impact, and possible biases. XAI may help to characterize accuracy, fairness, transparency, and outcomes, in particular when such models are used to make decisions that may affect the lives of individuals. Explainable AI may be important for an organization in generating trust, deploying ML models, and putting responsible AI principles into practice.

Generally speaking, different ML models may have different levels of interpretability and transparency to users. In fact, an explainability-accuracy trade-off may exist, where the best performing models for highly complex tasks, such as image or text classification, are Neural Networks (NN). These models may have highly non-linear complex architectures that are opaque in the sense of letting users understand how inputs to the model influence the output of the model. Due to this characteristic, such models are often described as 'black-box' models. Yet, their high performance often justifies their application in various high-impact, critical decision use cases, such as, for example: [1] self-driving vehicles; [2] computer assisted diagnostic (CAD) medical tools; [3] automated hiring triage systems; [4] credit/loan decision systems; [5] classifiers in use for the legal system; and [6] automated surgery tools.

Within use-cases such as these, ML tools may be performing various tasks, such as classification, which is application related to an embodiment of this invention. In classification, a model learns how to map an input to a set of classes. The training input might be images, texts, or tabular data, and the output may comprise the different classes of interest. For example, in a medical CAD tool, the input might be chest x-ray radiographies, and the labels might be the classes, or classifications, "healthy" and "pneumonia." That is, a radiography image might be classified as indicating the patient is "healthy" or has "pneumonia."

XAI techniques may attempt to derive an explanation as to how and why the classifications are occurring. The most common way is by assigning an importance weight to each input feature. The importance weights, also known as feature importance values, can be either global or local.

In global feature importance, each value corresponds to how a given type of feature might be swaying the classification when taking into the account the behavior of the entire distribution of the dataset. For example, in a credit/loan use case, the current salary of the prospective borrower might be a highly important feature for classifications, at the global level.

On the other hand, local feature importance is concerned with specific instances of the data. In contrast with global feature importance, some data points might specifically sway the classifier to a given class because of a particular feature only in that specific context. Again, with reference to the credit/loan hypothetical example, a loan may be denied to a client, despite them having a high salary, because of some other combination of features regarding that specific client. A local explanation would capture the insights that caused the different classification in that specific scenario. XAI techniques in general are typically concerned with local explanations, which is also the case in this invention, the related use-cases, and attacks.

Although various taxonomies of XAI methods have been proposed, with slightly differing nuances, some basic types of methods can be identified. These types are not mutually exclusive, although XAI techniques often belong to only one type. As discussed below, such techniques may include gradient techniques, perturbation techniques, and class activation maps (CAM).

Gradient techniques largely include calculating the vector of partial derivatives, or gradient, of the output layer backwards to the input layer. The gradients may provide an idea of how small changes in the input to a model might influence the outcome, or output of the model. In the illustrative case of images, for instance, gradients may show how each pixel influences the final classification of the image. Gradient techniques may assume that the auditor of an ML model has enough access to the model to allow for gradient computation. Some examples of gradient techniques include Vanilla Gradients (pure calculation of gradients from output to input), and SmoothGrad (calculation of gradients from output to input).

Another example of an XAI technique is a perturbation technique. This type of method involves changing the ML model input in controlled ways to observe the magnitude of the effect on the ML model output. This might be done by switching off certain values of the input, or substituting certain input values with values drawn from specific probability distributions. The choice of appropriate perturbations may be highly dependent on the type of data and classification problem. For images, it typically involves dividing the image into regions, sometimes referred to as superpixels, of similar textures and colors, since perturbing individual pixels can cause adversarial behavior to arise. Some examples of perturbation techniques include: LIME (Local Interpretable Model-Agnostic Explanations), RISE, and SHAP (Shapley Additive Explanations).

Still another XAI technique is referred to as Class Activation Maps (CAM). These methods are more typically related to the use of Convolutional Neural Networks (CNN) for image classification, and are based on the intuition that the last convolutions in a network contain the deepest abstractions extracted by the network. These XAI techniques attempt to combine these feature maps into an explanation heatmap, often through weighing of the feature maps by some parameters. A particularly popular technique of this type is referred to as GradCAM (Gradient-weighted Class Activation Mapping).

B. Context for Some Example Embodiments

Some example embodiments comprise approaches for defending a given ML model and XAI auditing system from adversarial attacks. As noted earlier, researchers in the area have demonstrated that XAI techniques are relatively fragile, and are vulnerable to attack. For example, attacks on an XAI process may be used to hide potential biases in the ML model in question. Particularly, an attack on an XAI process may change the explanation, generated by the XAI process, for a particular result obtained by the ML model. Thus, the attack may not change the actual result obtained by the ML model, but may change only the explanation generated by the XAI process for that result. In this way, the attack may operate to conceal a bias in the result obtained by the ML model by masking, modifying, or replacing, the true underlying explanation for how that result was achieved. That is, the modified explanation may indicate that there is little or no bias in the ML model, thereby leading a user to incorrectly conclude that there is no bias in the result generated by the ML model.

Thus, some embodiments of the invention may comprise a method that may serve to audit ML models through not just one, but rather a committee of different, XAI techniques, and thereby operate to counteract XAI attacks that may be directed at one or more of the XAI techniques.

It is noted that XAI attacks are typically highly specific to a given XAI auditing technique, or to a class of XAI auditing techniques, and do not immediately translate between different explanation, that is, XAI, approaches. As such, a committee or ensemble, as employed in some example embodiments of the invention, may constitute a straightforward but effective solution to XAI attacks. Following is a brief discussion of some typical XAI vulnerabilities.

C. Some XAI Vulnerabilities

In general, each type of XAI technique may have different respective vulnerabilities, specific to its algorithms and how they process data. Following are some examples.

C.1 Gradient Based XAI Attacks

Since gradient based XAI techniques are often used for image classification, the explanations involved in this case are normally saliency heatmaps. These heatmaps indicate the extent to which each given pixel contributes to a given outcome, where one example of an outcome is an image classification that indicates, for example, what the image is of, such as a cat or dog.

An adversary, or attacker, can craft a different heatmap of their choosing, that focuses on different parts of the image, to try and manipulate or fool the auditor into believing a model is fair when, in reality, the model is biased. For example, a chest x-ray classifier might produce inaccurate image classifications by focusing on spurious artifacts in the image of a lung, and ignoring relevant discolorations in that image. The adversary could attack the explanation as to why the image was classified based on the spurious artifacts, rather than being classified based on the relevant discolorations, so as to make it seem as though the image was properly classified based on the spurious artifacts when, in fact, the model improperly classified the image. Some attacks might operate in this way without noticeably changing classification probabilities, which might otherwise make the attack more obvious.

C.2 Perturbation Based XAI Attacks

Perturbation techniques typically involve creating a distribution of instances from a single instance of interest. The perturbed version of the data, however, could be so different from the base distribution of data that they are said to lay "out-of-distribution" (OOD). An adversary wishing to hide the biases of an unfair or inaccurate model could take advantage of this OOD data by having a separate classifier that parses OOD data from non-OOD, or original, data.

The OOD data, which may come exclusively from the XAI method of the auditor, could then be classified with a separate especially trained fair model, while the original data passes through the biased model of the adversary. This combination of classifiers that parses OOD data and then has separate classifiers depending on the result has been referred to in the related literature as a "scaffolding classifier." Because in a realistic auditing scenario, the scaffolding classifier would behave as a black-box, the auditor would not have an immediate way of realizing that the attack is taking place solely by looking at the outcomes, and might incorrectly be led to believe that the adversary model is producing fair results.

D. General Aspects of Some Embodiments of the Invention

In some ML model settings, each XAI auditing process may involve different types of data and different types of models, which may in turn imply that the same XAI techniques may not always be employed in all cases. Thus, an embodiment may define, and draw upon, a committee comprising different XAI techniques, using a set of policies that may automatically decide the best combination of XAI techniques to be used for each type of model and input.

The XAI techniques present included in a committee may include any number of perturbation-based, gradient-based and CAM techniques, examples of which are disclosed herein, as well as any new XAI methods that come into existence at a later time. However, as the precise nature and constitution of the committee is not available to an adversary, the use of a committee of XAI techniques makes an attack more difficult from the perspective of the adversary, since the adversary may not have enough information to optimize its attack. That is, the adversary may not know what XAI technique(s) the attack should be optimized for.

According to one embodiment then, an XAI auditing procedure using an XAI committee may proceed as follows:

1. analyzing how much information is available about the adversary black-box model;
2. selecting which types of XAI techniques are applicable—note that perturbation techniques may often be applicable because they are model-agnostic by nature;
3. applying XAI methods normally on the adversary black-box;
4. applying XAI methods again, with defenses such as beta-smoothing, and saliency heatmap averaging, if these are within the access rights granted to the auditor; and
5. varying the types of perturbations if applicable—applying more resilient gradient methods if applicable, such as SmoothGrad for example.

Thus, some example embodiments of the invention may possess various useful features and aspects. For example, an embodiment may comprise a method that uses a combination of XAI methods of various kinds to detect and/or thwart an XAI attack. As another example, an embodiment of the invention may prevent an XAI attacker from prosecuting an effective attack by optimizing against a particular XAI technique. That is, attacks targeting gradient techniques do not optimize against perturbation techniques, or other types of techniques, and vice versa. In an embodiment, the combination of these approaches, paired with whichever specific defenses exist for certain attacks at a given moment, create a more robust auditing framework. As one other example of aspects and features of an embodiment, since the particular aspects of XAI auditing may vary for different ML models and data types, and since new XAI methods, attacks, and defenses are constantly being developed, a method according to one embodiment may ensure that auditors will have, at least, a more robust framework for defense at their disposal. That is, a framework comprising a committee of XAI auditing techniques.

Two methods, specifically focusing on gradient explanations for images are beta-smoothing, and averaging of various saliency maps. Beta-smoothing may require changing all ReLU (rectified linear unit) activations of a given neural network to softplus, and decreasing the beta parameter of the softplus activation to determine if major changes are detected on the saliency map. Saliency map averaging, as the name indicates, is the simple arithmetic mean of various saliency heatmaps. Such averaging is part of certain techniques such as smooth gradients and integrated gradients. Beta-smoothing may not be a realistic option in many auditing scenarios since it requires the auditor to be able to edit the model at auditing time. The auditor may not have this level of expertise or access to the internals of the model. Where this level of access is possible however, beta-smoothing may be included as one of the options within an ensemble or committee, according to one example embodiment of the invention. Note that map averaging may comprise an element of certain gradient techniques, so map averaging may be at least implicitly included in a committee that includes such gradient techniques.

E. Detailed Discussion of Some Example Embodiments

With attention now to FIG. 1, an example architecture 100 according to an embodiment of the invention is disclosed. In general, FIG. 1 discloses the use of an XAI committee to counteract an adversarial attack and discloses how, in one embodiment, the XAI committee explores the fact that attacks are optimized specifically targeting a given method or class of methods. Note that broken lines in FIG. 1 denote an XAI attack that was not successful, since that XAI attack was not specifically optimized for that purpose.

In more detail, the architecture 100 of FIG. 1 may include an auditor 102, which may be a human, a machine, or a combination of the two. An aim of the auditor 102 is to attempt to provide an explanation 103 for particular results obtained by a machine learning (ML) model. The explanation 103 may indicate, for example, biases or other problems that may adversely affect the output of the ML model.

In order to make these determinations, or explanations 103, the auditor 102 may employ an XAI committee 104 that comprises multiple different XAI techniques 106. In an embodiment, the XAI committee 104 comprises at least two XAI techniques 106, but other embodiments of the XAI committee 104 may comprise more, or fewer, XAI techniques 106. In an embodiment, the composition of the XAI committee 104 may be manually changed, such as by a human, and/or automatically changed, such as by a computing system. Further, the composition of the XAI committee 104 may be changed at any time. In general, no particular number, or type, of XAI techniques 106 are necessarily required in any particular XAI committee.

In general, the XAI committee 104 may be used by the auditor 102 to detect, counteract, and/or, prevent, an XAI attack by an adversary 108. The adversary 108 may be a human, a machine, or a combination of the two. The adversary 108 may comprise, or otherwise be associated with, an XAI attack model 110, which may comprise a black box XAI attack model. Typically, the XAI attack model 110 is optimized to successfully attack a single, specific, XAI technique 106. As such, the XAI attack model 110 may be likely to be ineffective when directed against XAI techniques 106 for which the XAI attack model 110 is not optimized.

Note that as used herein, a 'successful' or 'effective' attack by an adversary 108 on an XAI technique 106 comprises, but is not limited to, masking, or obfuscating in some way, a bias that is present in the ML model that is being audited by that XAI technique 106. Thus, a successful or effective attack may prevent the identification of a bias in the results generated by an ML model.

Thus, in the example of FIG. 1, the XAI attack model 110 is optimized for the successful attack of a gradient XAI technique 106, but the XAI attack model 110 is not optimized for attacking a perturbation XAI technique 106 or a CAM XAI technique 106. As explained elsewhere herein, this disparity in the optimization of the XAI attack model 110 may be used by an embodiment of the invention to detect, counteract, and/or, prevent, an XAI attack by the adversary 108.

F. Some Example Experiments and Results

In order to better demonstrate the proposed idea, an experiment was performed by one or more of the inventors in which a committee of XAI methods, or techniques, was selected for an image classification task. The techniques used in the XAI committee included LIME, GradCAM (GC), Vanilla Gradients (VG), Smooth Gradients (SG) and Integrated Gradients (IG). A model of the EfficientNetB0 architecture was used. This is a state-of-the-art image classifier pre-trained on ImageNet. ImageNet, on the other hand, is a very large image dataset containing more than 14 million images distributed in 1000 classes. It is the most used benchmark for comparing state of the art image classifiers.

With reference now to FIG. 2, an ML image classification model was used to classify an image $I_o$ of a dog 202, referred to hereafter as 'original' image, and an image of a cat 204, hereafter referred to as the 'target' image. Subsequently, the Vanilla Gradient explanation heatmaps for these classifications were computed. These are disclosed in FIG. 2. Particularly, an adaptive attack was performed to generate an adversarial image 206. In simple terms, the attack used in the experiment involves the following objects:

(i) an original image $I_o$ to be classified which, in this case, is the dog image 202;

(ii) a target explanation heatmap $H_T$ 208 which is generated from the cat image 204; and (iii) an adversarial image $I_A$ 206 that should resemble the dog image 202 ($I_A \approx I_O$) —although the explanation heatmap $H_A$ 210 generated from this image 206, resembles heatmap 208 of the target cat image 204, that is, $H_A \approx H_T$.

What this means is that while the adversarial image 206 looks like a dog, as in the original image $I_o$ 202 that was to be classified by the ML model, the explanation for the classification of the adversarial image 206 generated by the attacker behaves as though the adversarial image 206 was of a cat. Notably, the adversarial image 206 not only visually resembles the original image 202, but the attacker may also ensure that the classification probabilities remain as close as possible to the original classification probabilities. This is done so that, to an unsuspecting auditor, the model would seem to be behaving normally. Otherwise, the adversarial image might give strange output probabilities due to the adversarial perturbations.

The attack in this example is visible in FIG. 2 which discloses respective Vanilla Gradients heatmaps 212, 208, and 210 for the original (dog) image 202, the target (cat) image 204, and the adversarial optimized image 206. Particularly, FIG. 2 discloses that the original image 202 and adversarial image 206 are, to the naked eye, nearly indistinguishable from each other, but the adversarial explanation heatmap 210 for the adversarial image 206 more closely resembles the target explanation heatmap 208 for the cat than the original explanation heatmap 212 for the original image 202 of the dog. Thus, the goal of the attack in this experiment was to change the original explanation heatmap 212 to a different explanation heatmap 210 consistent with the aim of the attacker, while preserving the output 206 to be the same as 202. That is, the explanation for the image classification has been changed by the attacker, although the output of the model in both cases appears to be the same. In this way, bias in the classification of the original image 202 may be concealed by changing the explanation for why the classification of the original image 202 was made.

The attack used in this experiment was proposed in: *Dombrowski, Ann-Kathrin, Maximillian Alber, Christopher Anders, Marcel Ackermann, Klaus-Robert Müller, and Pan Kessel. "Explanations can be manipulated and geometry is to blame." Advances in Neural Information Processing Systems* 32 (2019). In the experiment, the attack was implemented in Tensorflow 2.0, using a combined loss function:

$$L_{total} = L_{pred} + L_{heatmap}$$

where $L_{pred}$ is the Mean Squared Error (MSE) between the original ($p_O$) and adversarial ($p_A$) predictions, that is, image classifications: $L_{pred} = MSE(p_O, p_A)$ On the other hand, $L_{heatmap}$ is the loss associated with the MSE between the adversarial and target heatmaps $H_A$ and $H_T$, respectively (see FIG. 2):

$$L_{heatmap} = MSE(H_T, H_A)$$

By minimizing $L_{total}$ with gradient descent, an adversarial image was obtained that generates similar predictions to the original image, while generating explanation heatmaps that are similar to the explanation heatmap for the target image. This is how the adversarial image 206 displayed in FIG. 2 was obtained.

Figures 3, 4:
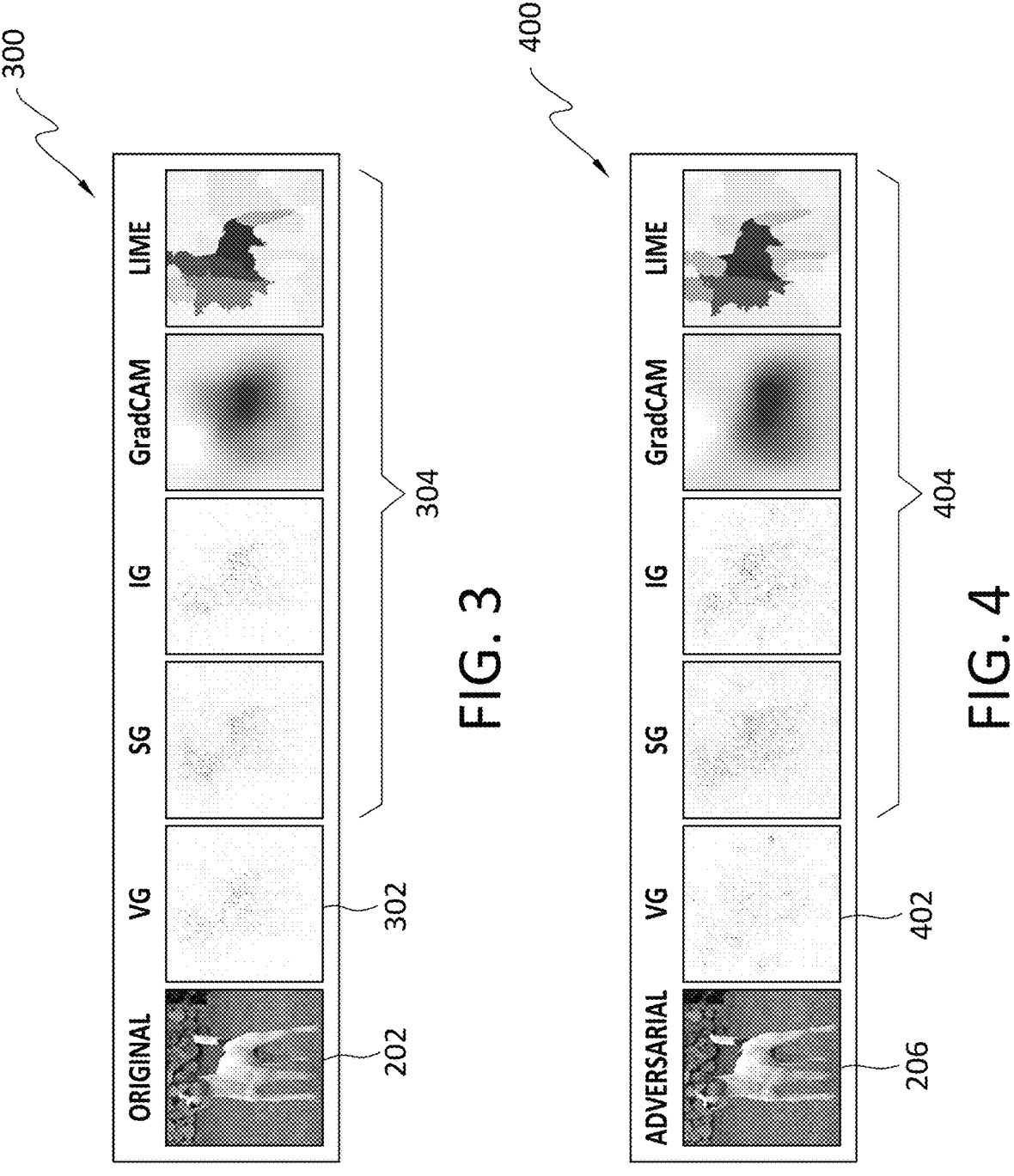
FIG. 3 discloses committee explanations for an original image, according to an embodiment.
FIG. 4 discloses committee explanations for the adversarial image, according to an embodiment.

FIG. 3 and FIG. 4 show the explanation heatmaps 300 and 400 generated by the XAI committee of selected techniques for, respectively, the original image 202 and the adversarial image 206. Notably, the attack used in this example targets the VG XAI technique (first column in FIGS. 3 and 4). That is to say, the explanation heatmap used as the target in $L_{heatmap}$ is the Vanilla Gradients heatmap. As shown, the VG explanation heatmaps are the ones that show the greatest difference between the two figures. This is sensible because the attack was optimized for this particular goal. However, the other techniques are not as affected by the attack, as shown in FIG. 4. This is true even for techniques of the same family of XAI methods, such as SG and IG. That is, as shown collectively in FIGS. 3 and 4, the attack was able to change the heatmap, that is, the explanation, generated by the VG technique (compare 302 and 402), but was not successful in changing the heatmaps 304 for the other XAI techniques, which appear the same in both FIG. 3 and FIG. 4 (see heatmaps 404).

In simple terms, although the adversarial image was successfully manipulated to make the VG XAI technique generate the target cat explanation heatmap, all the other XAI techniques still generate heatmaps similar to the heatmaps generated for the original dog. By comparing the various heatmaps then, an auditor can determine that the VG XAI technique is being attacked. Thus, in this example, the adversarial attack is only effective for the particular technique it was devised against. This means that if such an attack takes places during auditing, an auditor using only Vanilla Gradients would be forced to make decisions based on a manipulated, compromised heatmap.

However, by using the XAI committee proposed in this example, the auditor would notice that only the Vanilla Gradients XAI technique is highlighting significantly different regions of the image, as compared to the other methods. This could prompt the auditor to employ various measures such as, but not limited to: [1] probing the compromised technique with specific defense measures—these vary by technique, but for a suspected attack on the Vanilla Gradients XAI technique, beta smoothing is a possible defensive test; [2] avoiding the use of the compromised technique for that particular auditing process; and [3] requesting additional access to model internals and algorithms to the adversary to ensure that no tampering is taking place. Note that as more defenses are developed, those defenses may similarly be included in an embodiment of the committee.

G. Example Methods

Figure 5:
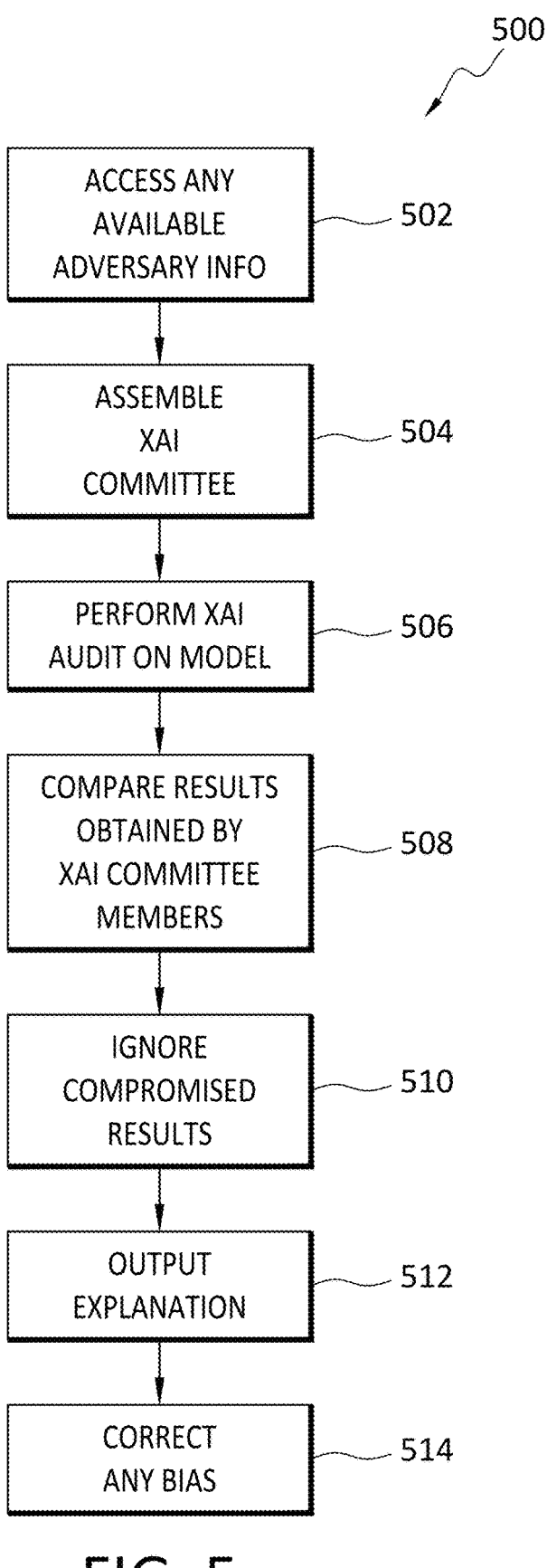
FIG. 5 discloses an example method according to one embodiment.

It is noted with respect to the disclosed methods, including the example method of FIG. 5, that any operation(s) of any of these methods, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 5, a method according to one example embodiment is denoted generally at 500. In an embodiment, part or all of the method 500 may be performed by an auditor. The auditor may or may not interact with an adversary.

The example method 500 may begin when any available information about an adversary is accessed 502. When available, this information may provide insights as to the XAI technique(s) for which an attack by the adversary is optimized. Note however, that one or more embodiments do not require access to this adversary information.

An XAI committee, comprising multiple different XAI techniques may then be assembled 504. In an embodiment, the XAI committee may be assembled without knowledge or awareness of the part of the auditor as to which particular XAI technique(s) an attack is optimized for. In an embodiment, the XAI committee may comprise at least two different XAI techniques. Further, in an embodiment, fewer than all of the XAI techniques in the committee may be performed with regard to a particular ML model and its results.

When the XAI committee has been assembled 504, an XAI audit of the results generated by an ML model may then be performed 506. In general, an aim of the XAI audit may be to identify explanations for results generated the ML model. The various XAI techniques that make up the XAI committee may be performed serially, or in parallel. No particular order of the performance of the XAI techniques is necessarily required.

When the respective explanations have been generated 506 by the XAI techniques that make up the committee, a comparison 508 of the various explanations may be performed. The comparison 508 may be used to identify, and ignore 510, any explanations that are inconsistent with explanations produced by the other XAI techniques of the committee. Because an attack may be optimized for only a single XAI technique, the comparison 508 may readily identify which of the explanations has been generated by an attacker, and the explanation generated by the attacker may be ignored 510 when assessing the results of the XAI audit on the ML model.

After the explanation(s) produced by an attacker have been culled from the results of the XAI audit 510, the valid explanation(s) for the results achieved by the ML model may then be output 512. Based on the output explanations, the ML model may then be modified to correct 514 any bias in the process used by the ML model to generate its results.

H. Further Example Embodiments

Following are some further example embodiments of the invention. These are presented only by way of example and are not intended to limit the scope of the invention in any way.

Embodiment 1. A method, comprising: assembling an explainable artificial intelligence committee comprising two or more explainable artificial intelligence techniques; performing the explainable artificial intelligence techniques on results generated by a machine learning model; as a result of the performing, obtaining respective explanations, generated by each of the explainable artificial intelligence techniques, for the results generated by the machine learning model; and determining that one of the explanations was compromised by an attacker.

Embodiment 2. The method as recited in embodiment 1, wherein the machine learning model is an image classification model.

Embodiment 3. The method as recited in any of embodiments 1-2, wherein the explainable artificial intelligence techniques include any one or more of: a gradient technique; a perturbation technique; and, a class activation map.

Embodiment 4. The method as recited in any of embodiments 1-3, wherein one or more of the explanations comprises a respective heatmap.

Embodiment 5. The method as recited in any of embodiments 1-4, wherein determining that one of the explanations was compromised by an attacker comprises comparing the compromised explanation to one of the other explanations, and the other explanation was generated for a non-adversarial output of the machine learning model.

Embodiment 6. The method as recited in any of embodiments 1-5, wherein, based on the determining, an attack generated by the attacker is thwarted.

Embodiment 7. The method as recited in any of embodiments 1-6, wherein the assembling is performed based in part upon information obtained regarding an explainable artificial intelligence attack model controlled by the attacker.

Embodiment 8. The method as recited in any of embodiments 1-7, wherein an explanation generated by one of the explainable artificial intelligence techniques reveals a bias in the results generated by the machine learning model.

Embodiment 9. The method as recited in any of embodiments 1-8, wherein the assembling of the explainable artificial intelligence committee is performed automatically.

Embodiment 10. The method as recited in any of embodiments 1-9, wherein the compromised explanation comprises an explanation that is different from an explanation that would have been generated absent an attack by the attacker.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

I. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
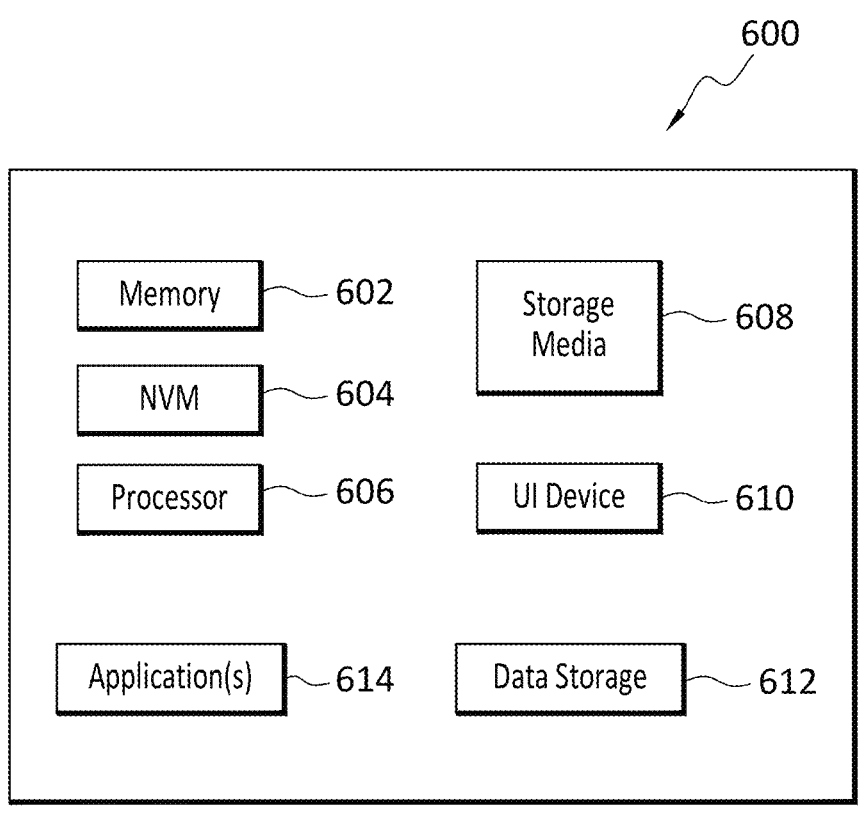
FIG. 6 discloses an example computing entity configured to perform any of the disclosed methods, processes, and operations.

With reference briefly now to FIG. 6, any one or more of the entities disclosed, or implied, by FIGS. 1-5 and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 6.

In the example of FIG. 6, the physical computing device 600 includes a memory 602 which may include one, some, or all, of random access memory (RAM), non-volatile memory (NVM) 604 such as NVRAM for example, read-only memory (ROM), and persistent memory, one or more hardware processors 606, non-transitory storage media 608, UI (user interface) device 610, and data storage 612. One or more of the memory components 602 of the physical computing device 600 may take the form of solid state device (SSD) storage. As well, one or more applications 614 may be provided that comprise instructions executable by one or more hardware processors 606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

assembling an explainable artificial intelligence committee comprising two or more explainable artificial intelligence techniques;

performing the explainable artificial intelligence techniques on results generated by a machine learning model;

as a result of the performing, obtaining respective explanations, generated by each of the explainable artificial intelligence techniques, for the results generated by the machine learning model;

determining that one of the explanations, which was generated by one explainable artificial intelligence technique, was masked, modified, or replaced by an attacker;

ignoring the one of the explanations that was masked, modified, or replaced by the attacker; and outputting valid explanations other than the one of the explanations, wherein determining that one of the explanations was compromised by an attacker comprises comparing the masked, modified, or replaced explanation to one of the other explanations, which were generated by explainable artificial intelligence techniques other than the one explainable artificial intelligence technique.

2. The method as recited in claim 1, wherein the machine learning model is an image classification model.

3. The method as recited in claim 1, wherein the explainable artificial intelligence techniques include any one or more of: a gradient technique; a perturbation technique; and, a class activation map.

4. The method as recited in claim 1, wherein one or more of the explanations comprises a respective heatmap.

5. The method as recited in claim 1, wherein, based on the determining, an attack generated by the attacker is thwarted.

6. The method as recited in claim 1, wherein the assembling is performed based in part upon information obtained regarding an explainable artificial intelligence attack model controlled by the attacker.

7. The method as recited in claim 1, wherein an explanation generated by one of the explainable artificial intelligence techniques reveals a bias in the results generated by the machine learning model.

8. The method as recited in claim 1, wherein the assembling of the explainable artificial intelligence committee is performed automatically.

9. The method as recited in claim 1, wherein the masked, modified, or replaced explanation comprises an explanation that is different from an explanation that would have been generated absent an attack by the attacker.

10. A non-transitory storage medium having stored therein instructions that are executable by one or more hardware processors to perform operations comprising:

assembling an explainable artificial intelligence committee comprising two or more explainable artificial intelligence techniques;

performing the explainable artificial intelligence techniques on results generated by a machine learning model;

as a result of the performing, obtaining respective explanations, generated by each of the explainable artificial intelligence techniques, for the results generated by the machine learning model;

determining that one of the explanations, which was generated by one explainable artificial intelligence technique, was masked, modified, or replaced by an attacker;

ignoring the one of the explanations that was masked, modified, or replaced by the attacker; and outputting valid explanations other than the one of the explanations, wherein determining that one of the explanations was compromised by an attacker comprises comparing the masked, modified, or replaced explanation to one of the other explanations, which were generated by explainable artificial intelligence techniques other than the one explainable artificial intelligence technique.

11. The non-transitory storage medium as recited in claim 10, wherein the machine learning model is an image classification model.

12. The non-transitory storage medium as recited in claim 10, wherein the explainable artificial intelligence techniques include any one or more of: a gradient technique; a perturbation technique; and, a class activation map.

13. The non-transitory storage medium as recited in claim 10, wherein one or more of the explanations comprises a respective heatmap.

14. The non-transitory storage medium as recited in claim 10, wherein, based on the determining, an attack generated by the attacker is thwarted.

15. The non-transitory storage medium as recited in claim 10, wherein the assembling is performed based in part upon information obtained regarding an explainable artificial intelligence attack model controlled by the attacker.

16. The non-transitory storage medium as recited in claim 10, wherein an explanation generated by one of the explainable artificial intelligence techniques reveals a bias in the results generated by the machine learning model.

17. The non-transitory storage medium as recited in claim 10, wherein the assembling of the explainable artificial intelligence committee is performed automatically.

18. The non-transitory storage medium as recited in claim 10, wherein the masked, modified, or replaced explanation comprises an explanation that is different from an explanation that would have been generated absent an attack by the attacker.

* * * * *